(12) United States Patent
Zhang et al.

(10) Patent No.: US 9,264,180 B2
(45) Date of Patent: Feb. 16, 2016

(54) METHOD, NETWORK NODE, COMPUTER PROGRAM AND COMPUTER PROGRAM PRODUCT FOR DECODING A SIGNAL

(75) Inventors: Haochuan Zhang, Beijing (CN); Yang Hu, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/366,995

(22) PCT Filed: Dec. 21, 2011

(86) PCT No.: PCT/CN2011/002145
§ 371 (c)(1),
(2), (4) Date: Jun. 19, 2014

(87) PCT Pub. No.: WO2013/091137
PCT Pub. Date: Jun. 27, 2013

(65) Prior Publication Data
US 2014/0362956 A1      Dec. 11, 2014

(51) Int. Cl.
*H04B 1/00*      (2006.01)
*H04L 1/00*      (2006.01)
(Continued)

(52) U.S. Cl.
CPC .......... *H04L 1/0045* (2013.01); *H04B 1/70752* (2013.01); *H04B 1/7107* (2013.01); *H04B 1/71072* (2013.01); *H04L 1/0057* (2013.01)

(58) Field of Classification Search
CPC ......... H03G 3/345; H03G 3/344; H03G 3/34; H04B 1/1027; H04L 1/20
USPC .................................. 375/130–150, 316–351
See application file for complete search history.

(56) References Cited

U.S. PATENT DOCUMENTS

| 6,229,839 B1 * | 5/2001 | Levin ................... H04B 1/7085 370/320 |
| 6,289,061 B1 * | 9/2001 | Kandala ............... H04B 1/7115 375/326 |

(Continued)

FOREIGN PATENT DOCUMENTS

| CN | 101292561 A | 10/2008 |
| WO | WO 01/43302 A1 | 6/2001 |

(Continued)

OTHER PUBLICATIONS

Ericsson: "Remote BS-BS interference impact on TD-LTE PUCCH ACK/NACK transmission" Technical Report No. EAB-11;045676 Uen; 17 pages.

(Continued)

*Primary Examiner* — James M Perez
(74) *Attorney, Agent, or Firm* — Myers Bigel Sibley & Sajovec, P.A.

(57) ABSTRACT

According to a first aspect, it is presented a method for decoding at least one signal from a sequence of symbols. The method is executed in a network node of a mobile communication system and comprises the steps of: receiving a sequence of symbols using a radio receiver; identifying at least one corrupted symbol by identifying a corruption of at least the first received symbol of the plurality of symbols; obtaining a working set of symbols, by omitting the at least one corrupted symbol from the sequence of symbols; and de-spreading the working set of symbols using a subset of a first de-spreading code, wherein the subset of the first de-spreading code comprises code elements corresponding to the working set of symbols, to thereby provide a first decoded signal. A corresponding network node, computer program and computer program product are also presented.

12 Claims, 3 Drawing Sheets

(51) Int. Cl.
*H04B 1/7107* (2011.01)
*H04B 1/7075* (2011.01)

(56) References Cited

U.S. PATENT DOCUMENTS

| | | | |
|---|---|---|---|
| 6,810,073 B1* | 10/2004 | Karlsson | 375/144 |
| 2004/0057502 A1* | 3/2004 | Azenkot | H04L 1/0045 375/147 |
| 2007/0040704 A1* | 2/2007 | Smee et al. | 340/981 |
| 2007/0110095 A1* | 5/2007 | Attar et al. | 370/458 |
| 2011/0044409 A1* | 2/2011 | Yoshimoto | H04J 11/004 375/340 |

FOREIGN PATENT DOCUMENTS

| | | |
|---|---|---|
| WO | WO 2004/029554 A2 | 4/2004 |
| WO | WO 2004/029554 A3 | 4/2004 |
| WO | WO 2007/024963 A2 | 3/2007 |
| WO | WO 2007/059523 A1 | 5/2007 |

OTHER PUBLICATIONS

3GPP TS 36,211 V11.2.0 (Feb. 2013); 3$^{rd}$ Generation Partnership Project; Technical Specification Group Radio Access Network; Evolved Universal Terrestrial Radio Access (E-UTRA); Physical Channels and Modulation (Release 11); 109 pages.

3GPP TS 36.212 V11.2.0 (Feb. 2013); 3$^{rd}$ Generation Partnership Project; Technical Specification Group Radio Access Network; Evolved Universal Terrestrial Radio Access (E-UTRA); Multiplexing and channel coding (Release 11); 82 pages.

3GPP TS 36.213 V11.2.0 (Feb. 2013); 3$^{rd}$ Generation Partnership Project; Technical Specification Group Radio Access Network; Evolved Universal Terrestrial Radio Access (E-UTRA); Physical layer procedures (Release 11); 173 pages.

International Search Report and Written Opinion of the International Searching Authority, PCT Application No. PCT/CN2011/002145, Oct. 4, 2012.

Communication with Supplementary European Search Report, EPO Application No. 11877745.7, Jul. 2, 2015.

NTT Docomo et al., "Length-4 OCC Mapping Scheme for DM-RS Rank 5-8 in LTE-Advanced", Agenda Item: 6.3.1.2, Document for Discussion and Decision, 3GPP TSG RAN WG1 Meeting #60bis, R1-102296, Beijing, China, Apr. 12-16, 2010, 8 pp.

Takeda et al., "Demodulation Reference Signal Using Two-Dimensional Orthogonal Cover Code Mapping for Multi-Antenna/Point Transmission in LTE-Advanced Downlink", *IEICE Trans. Commun.*, vol. E94-B, No. 12, Dec. 2011, pp. 3354-3361.

\* cited by examiner

METHOD, NETWORK NODE, COMPUTER PROGRAM AND COMPUTER PROGRAM PRODUCT FOR DECODING A SIGNAL

CROSS REFERENCE TO RELATED APPLICATION

This application is a 35 U.S.C. §371 national stage application of PCT International Application No. PCT/CN2011/002145, filed on 21 Dec. 2011, the disclosure and content of which is incorporated by reference herein in its entirety. The above-referenced PCT International Application was published in the English language as International Publication No. WO 2013/091137 A1 on 27 Jun. 2013.

TECHNICAL FIELD

The invention relates to a network node in a mobile communication network. In particular the invention relates to decoding one or more signals in the network node.

BACKGROUND

In mobile communication systems, network nodes such as evolved node Bs (eNBs) of a long term evolution (LTE) system sometimes experience interference from surrounding eNBs.

The effect of the interference can be reduced by using code division multiplex. However, when the interference is strong, this can overshadow the symbols resulting from the desired signal. In other words, de-spreading as known in the art will cause interference leakage over all groups of users that are code division multiplexed.

SUMMARY

It is thus desired to provide a way in which the effect of strong interference is reduced.

According to a first aspect, it is presented a method for decoding at least one signal from a sequence of symbols. The method is executed in a network node of a mobile communication system and comprises the steps of: receiving a sequence of symbols using a radio receiver; identifying at least one corrupted symbol by identifying a corruption of at least the first received symbol of the plurality of symbols; obtaining a working set of symbols, by omitting the at least one corrupted symbol from the sequence of symbols; and de-spreading the working set of symbols using a subset of a first de-spreading code, wherein the subset of the first de-spreading code comprises code elements corresponding to the working set of symbols, to thereby provide a first decoded signal. By omitting the at least one corrupted symbol, it is possible to de-spread the first decoded signal. This is particularly useful when the first de-spreading code is orthogonal to other de-spreading codes, whereby the effect of the corrupted symbol on decoding the first decoded signal is reduced or even eliminated.

The sequence of symbols may comprise four symbols.

The subset of the first de-spreading code may comprise two code elements.

The method may further comprise: removing the contribution of the first decoded signal from the working set of symbols, yielding an adjusted working set of symbols; de-spreading the adjusted working set of symbols using a subset of a second de-spreading code, wherein the subset of the second de-spreading code comprises code elements corresponding to the adjusted working set of symbols, to thereby provide a second decoded signal; and de-spreading the adjusted working set of symbols using a subset of a third de-spreading code, wherein the subset of the third de-spreading code comprises code elements corresponding to the adjusted working set of symbols, to thereby provide a third decoded signal. As long as the second de-spreading code and third de-spreading code are orthogonal to each other in the time slots of the adjusted working set, the second and third decoded signals can in this way also be decoded while the effect of the corrupted symbol is reduced or even eliminated.

The first decoded signal may be associated with a first group of users, the second decoded signal may be associated with a second group of users and the third decoded signal may be associated with a third group of users. Each group can consist of zero, one ore more users at any one time, depending on load.

The sequence of symbols may comprise four symbols; the step of de-spreading to provide the first decoded signal may comprises de-spreading the last two symbols of the sequence of symbols; the step of de-spreading to provide the second decoded signal may comprise de-spreading the second and third symbols of the sequence of symbols; and the step of de-spreading to provide the third decoded signal may comprise de-spreading the second and third symbols of the sequence of symbols.

The step of removing may comprise subtracting the contribution of the first decoded signal from the working set of symbols.

The mobile communication system may comply with the Long Term Evolution family of standards of 3GPP, 3rd Generation Partnership Project.

The step of identifying at least one corrupted symbol may comprise detecting a saturation of an analogue to digital converter. This is one possible way of detecting saturation which can be implemented using existing structures.

The symbols in the sequence of symbols may be digital representations of analogue received signals in a configured frequency range.

The method may be repeated for each new sequence of symbols.

A second aspect is a network node for decoding at least one signal from a sequence of symbols. The network node is arranged to operate in a mobile communication system and the network node comprises: a receiver arranged to receive a sequence of symbols using a radio receiver; a corruption identifier arranged to identify at least one corrupted symbol by identifying a corruption of at least the first received symbol of the plurality of symbols; a working set obtainer arranged to obtain a working set of symbols by omitting the at least one corrupted symbol from the sequence of symbols; and a de-spreader arranged to de-spread the working set of symbols using a subset of a first de-spreading code, wherein the subset of the first de-spreading code comprises code elements corresponding to the working set of symbols, to thereby provide a first decoded signal.

The sequence of symbols may comprise four symbols.

The subset of the first de-spreading code comprises two code elements.

The network node may further comprise a contribution remover arranged to remove the contribution of the first decoded signal from the working set of symbols, yielding an adjusted working set of symbols; and the de-spreader may further be arranged to de-spread the adjusted working set of symbols using a subset of a second de-spreading code, wherein the subset of the second de-spreading code comprises code elements corresponding to the adjusted working set of symbols, to thereby provide a second decoded signal;

and to de-spread the adjusted working set of symbols using a subset of a third de-spreading code, wherein the subset of the third de-spreading code comprises code elements corresponding to the adjusted working set of symbols, to thereby provide a third decoded signal.

The first decoded signal may be associated with a first group of users, the second decoded signal may be associated with a second group of users and the third decoded signal may be associated with a third group of users.

The sequence of symbols may comprise four symbols; and the de-spreader may be arranged to: provide the first decoded signal comprising de-spreading the last two symbols of the sequence of symbols; provide the second decoded signal comprising de-spreading the second and third symbols of the sequence of symbols; and provide the third decoded signal comprising de-spreading the second and third symbols of the sequence of symbols.

The contribution remover may be arranged to subtract the contribution of the first decoded signal from the working set of symbols.

The network node may comply with the Long Term Evolution family of standards of 3GPP, 3rd Generation Partnership Project.

The corruption identifier may be arranged to detect a saturation of an analogue to digital converter.

The symbols in the sequence of symbols may be digital representations of analogue received signals in a configured frequency range.

A third aspect is a computer program for decoding at least one signal from a sequence of symbols in a network node of a mobile communication system. The computer program comprises computer program code which, when run on a network node, causes the network node to: receive a sequence of symbols using a radio receiver; identify at least one corrupted symbol by identifying a corruption of at least the first received symbol of the plurality of symbols; obtain a working set of symbols, by omitting the at least one corrupted symbol from the sequence of symbols; and de-spread the working set of symbols using a subset of a first de-spreading code, wherein the subset of the first de-spreading code comprises code elements corresponding to the working set of symbols, to thereby provide a first decoded signal.

A fourth aspect is a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
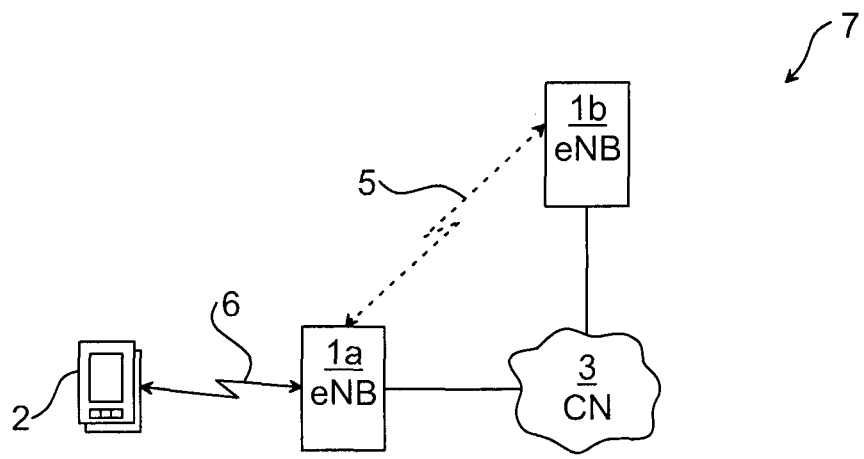
FIG. 1 is a schematic diagram illustrating an environment where embodiments presented herein can be applied.

FIG. 1 is a schematic diagram illustrating a mobile communication network 7 where embodiments presented herein can be applied. The mobile communications network 7 comprises a core network 3, a first network node 1a and a second network node 1b. In this embodiment, the network nodes 1a-b are evolved Node Bs, also known as e-Node Bs or eNBs but could be other base stations functioning in the same way. The network nodes 1a-b provide radio connectivity to one more mobile terminals 2. The term mobile terminal is also known as user equipment, mobile communication terminal, user terminal, user agent, etc.

The mobile communication network, can e.g. comply with LTE (Long Term Evolution) or with any one of a combination of UMTS (Universal Mobile Telecommunications System), CDMA2000 (Code Division Multiple Access 2000), etc. The mobile communication network may operate in Frequency Division Duplex (FDD) where signals to and from the mobile communication terminals are transmitted over separate frequencies. Some of the systems may also operate in Time Division Duplex (TDD) were the signals to and from the mobile terminals are transmitted over the same frequency carrier separated in time. The embodiments will be further explained with example in TDD operation, because severe interference is common to hit the beginning of the uplink period after transition from downlink period on the frequency carrier, and then the solutions disclosed herein are of particular advantage to use.

The first network node 1a has radio receivers to receive signals 6 from the mobile terminal 2. However, the first network node 1a will also receive undesired signals 5 from surrounding network nodes 1b. There are guard periods to reduce the risk of interference, but as will be shown below, if the distance to the surrounding network node 1b is sufficiently large, interference will occur, which makes it difficult for the network node 1a to extract the desired signal from the mobile terminal 2.

Figure 2:
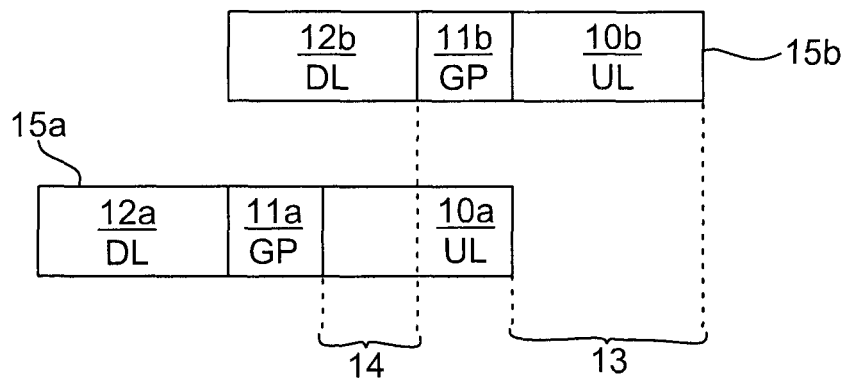
FIG. 2 is a schematic diagram illustrating interference which can be experienced by the first network node 1a of FIG. 1.

FIG. 2 is a schematic diagram illustrating interference which can be experienced by the first network node 1a of FIG. 1. The lower part shows a first frame 15a relating to communication with the mobile terminal(s) 2, and the upper part shows a second frame 15b relating to another network node, such as the second network node 1b of FIG. 1, as experienced by the first network node 1a. The first frame 15a comprises a first downlink period 12a, a first guard period 11a and a first uplink period 10a. Similarly, the second frame 15b comprises a second downlink period 12b, a second guard period 11b and a second uplink period 10b.

Due to the distance to the second network node 1b, and the time for the signal from the second network node to propagate to the first node the signal, there is a delay 13 in the timing of the signal from the second network node relative to the timing in the first network node. When the delay 13 is larger than the duration of the guard periods 11a-b, the first part of the first uplink period 10a will overlap 14 the end of the second downlink period 12b. This results in interference during the overlap 14, whereby the first network node receives uplink signals from the mobile terminal at the same time as it receives downlink signals from the second network node. This results in one or more received symbols being corrupted by the interference.

Figure 3:
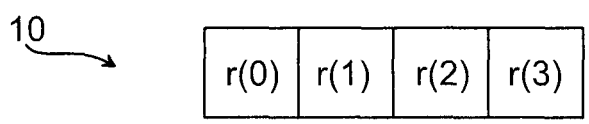
FIG. 3 is a schematic diagram illustrating a sequence of symbols.
Figure 4:
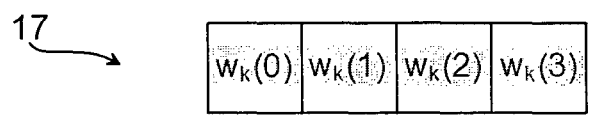
FIG. 4 is a schematic diagram illustrating a de-spreading code.

It will now be explained a little more about how signals are de-spread in LTE, with reference to the received sequence of symbols 10 of FIG. 3 and the de-spreading code 17 of FIG. 4.

In LTE (& LTE-A), physical uplink control channel (PUCCH) format 1/1a/1b is used by the mobile terminal to convey scheduling request and/or retransmission request to the eNode B. Here, we note that the length-4 orthogonal sequences (referred as cover codes) are used to increase the capacity of the channel. The cover codes are defined as follows:

TABLE 1

Orthogonal sequences for PUCCH

| Sequence index for group | Orthogonal sequence |
| --- | --- |
| 0 | [+1 +1 +1 +1] |
| 1 | [+1 −1 +1 −1] |
| 2 | [+1 −1 −1 +1] |

The three cover codes defined in Table 1 allow for at most three code-division multiplexed (CDM) groups of users (the number of users in each group depends on the cyclic shift amount of the length-12 phase-rotated sequence, and is not described further here).

In the presence of the base station to base station interference from the remote network node, the uplink performance of the interfered cell is severely degraded, because at the eNode B, the received signal strength from the remote interfering eNB is still much higher than the signal strength from the terminal at local area, even after a long distance free-space-like propagation. This degradation caused by remote base station to base station interference has already been observed in the field.

Besides uplink performance, the remote base station to base station interference may further degrade the performance of the downlink. This is because retransmission requests (e.g. ACK/NACK corresponding to the downlink transmission) as well as scheduling requests may not be correctly decoded due to the existence of strong interference.

To be specific, for TD-LTE (Time Division LTE) systems, once some orthogonal frequency division multiplexing (OFDM) symbols of an uplink sub-frame are corrupted by strong interference, the PUCCH format 1/1a/1b that carries retransmission requests and/or scheduling request may not work properly. The reason lies in the fact that de-spreading with the interfered symbols will cause a leakage of the strong interference to all the OFDM symbols. As a consequence, all the OFDM symbols are corrupted by the interference, and all the three groups of users could not be correctly decoded.

However, in PUCCH format 1/1a/1b, there are two slots that carry the same information. If only some part of the first slot is corrupted, one can simply discard it and rely only on the second slot to recover the information. However, if both the first slot and part of the second slot are corrupted, discarding both slots is definitely not a good option. A better solution is to try to recover the information, given the partially corrupted slot, no matter if it is the first or the second slot.

To be specific, given a partial corrupted slot in PUCCH format 1/1a/1b, it is here disclosed a successive interference cancellation method to get the interference free results for all three groups of users, or one group if two symbols are corrupted. Initially, we focus on the case where only the first OFDM symbol in a slot is corrupted by strong interference, and the remaining symbols remain uncorrupted. The first-symbol-corrupted case is the most typical one since the first OFDM symbol is most likely to be corrupted. More corrupted symbols indicate a further distance and thus weaker signal strength of the interference.

This issue will now be illustrated more analytically. To decode PUCCH format 1/1a/1b, a (block) de-spreading operation is needed at the receiver side. This (block) de-spreading is the reverse operation of the (block) spreading at the transmitter. Below we consider the de-spreading process.

Let $[r(0), r(1), r(2), r(3)]$ denote the signals to be de-spread at the four OFDM symbols that carry BPSK/QPSK. (Binary phase-shift keying/Quadrature phase-shift keying) symbols. The received sequence of symbols is then made up of the following components:

$$[r(0), r(1), r(2), r(3)] = \quad (1)$$
$$d_0 \cdot [w_0(0), w_0(1), w_0(2), w_0(3)] + d_1 \cdot [w_1(0), w_1(1), w_1(2), w_1(3)] +$$
$$d_2 \cdot [w_2(0), w_2(1), w_2(2), w_2(3)] + [z(0), z(1), z(2), z(3)],$$

Where $r(i)$ is the symbol received at time slot i, $d_k$ is the signal sent by the group k, $w_k(i)$ is the de-spreading code for group k at symbol time slot i, and $z(i)$ is the noise and/or interference received at symbol time slot i.

The de-spreading codes of table 1 can thus be expressed as:

$$[w_0(0), w_0(1), w_0(2), w_0(3)] = [+1, +1, +1, +1],$$

$$[w_1(0), w_1(1), w_1(2), w_1(3)] = [+1, -1, +1, -1],$$

$$[w_2(0), w_2(1), w_2(2), w_2(3)] = [+1, -1, -1, +1]$$

The problem here is thus, given that the first signal $r(0)$ is corrupted by strong interference, i.e., $z(0) \gg d_k$ (for all k=0, 1, 2), how to get fully interference free estimates for the signals $d_0$, $d_1$, and $d_2$, based on the received sequence of symbols $[r(0), r(1), r(2), r(3)]$? It is to be noted that each received symbol $r(i)$ is a digital representation of received signals and can have any complex number value.

Conventionally, the de-spreading codes are applied to get an estimate of $d_k$ according to the following:

$$\hat{d}_k = \frac{1}{4} \sum_{i=0}^{3} w_k(i) \cdot r(i), \text{ for all } k = 0, 1, 2, \quad (2)$$

where $\hat{d}_k$ is the estimate of $d_k$, i.e. a decoded signal.

Unfortunately, the de-spreading above does not work if strong interference exist, because the de-spreading in equation (2) will bring about a leakage of the interference to all the signals, leading to an results that all estimates are interference polluted. To see this, consider the aforementioned case of strong interference at the first OFDM symbol, i.e. $z(0) \gg d_k$. De-spreading as equation (2) yields the estimates that are dominated by the interference:

$$\hat{d}_k \approx \pm \frac{z(0)}{4}, \text{ for all } k = 0, 1, 2. \quad (3)$$

Given the fact that only the first signal is corrupted, de-spreading using the truncated length-3 cover codes $[w_k(1), w_k(2), w_k(3)]$ seems to be a good solution to the interference-leakage problem. But the interference still remains, as the truncated length-3 cover codes are non-orthogonal to each other. Consequently, de-spreading with these non-orthogonal codes will lead to severe interference between different groups.

However, examining the de-spreading code, it can be seen that the truncated length-2 sequence $[w_0(2), w_0(3)] = [+1, +1]$ is orthogonal to both $[w_1(2), w_1(3)] = [+1, -1]$ and $[w_2(2), w_2(3)] = [-1, +1]$. De-spreading a working set of symbols $[r(2), r(3)]$ with $[w_0(2), w_0(3)]$ thus yields an interference free result for the first group of users.

Once the interference free estimate $\hat{d}_0$ is obtained, an adjusted working set of symbols is obtained by be removing the impact of the interference free estimate $\hat{d}_0$ from the received sequence of symbols for time slots 1 and 2, $[r(1), r(2)]$. After this removal, the cover codes of remaining two groups are orthogonal to each other for time slots 1 and 2.

The interference free estimates for the two remaining groups 1 and 2 cab thus be obtained by de-spreading the remaining two groups only using these time slots 1 and 2. The cover codes used are then, $[w_1(1), w_1(2)] = [-1, +1]$ and $[w_2(1), w_2(2)] = [-1, -1]$, which are orthogonal.

In this way, fully interference free results for all the three groups are obtained in a successive way.

Expressed analytically, the estimate for the signal for the first group is first obtained according to:

$$\hat{d}_0 = \frac{1}{2} \sum_{i=2}^{3} w_0(i) \cdot r(i). \quad (4)$$

Secondly, the signal estimate for the remaining groups is obtained according to:

$$\hat{d}_k = \frac{1}{2} \sum_{i=1}^{2} w_k(i) \cdot [r(i) - w_0(i) \cdot \hat{d}_0], \text{ (for } k = 1, 2). \quad (5)$$

Considering the case where two OFDM symbols (the first and the second) within a slot of PUCCH format 1/1a/1b are corrupted by strong interference. Again, conventional de-spreading does not work properly. But the algorithm described above can provide an interference free result for the first group of user via equation 4 above.

Although interference free results for the other two groups are difficult to get (because the second received symbol is also corrupted by the interference and the two groups are no longer orthogonal to each in terms of length-2 cover code), the solution here is better than the conventional de-spreading via length-4 cover codes (where all groups are interfered due to the leakage aforementioned) since at least one interference free group of user is provided.

Figure 5A:
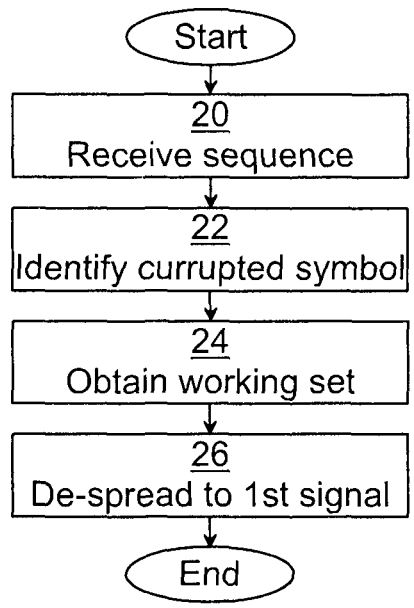
FIG. 5A-B are flow charts illustrating methods according to embodiments performed in the network node of FIG. 1.

FIG. 5A is a flow chart illustrating a method according to embodiments performed in the network node of FIG. 1. The method corresponds to what is described above, and thus aims to decode at least one signal from a sequence of symbols. The method is executed in the network node of the mobile communication system of FIG. 1. The network node can e.g. be a base station (e.g. eNB), relay nodes or repeater nodes.

In an initial receive sequence step 20, a sequence of symbols r(i) is received using a radio receiver. The sequence of symbols can comprise four symbols as described above. The symbols in the sequence of symbols can be digital representations of analogue received signals in a configured frequency range.

In an identify corrupted symbol step 22, at least one corrupted symbol is identified by identifying a corruption of at least the first received symbol of the plurality of symbols. The corruption can occur in many different ways, e.g. by detecting a saturation of an analogue to digital converter.

In an obtain working set step 24, a working set of symbols is obtained, by omitting the at least one corrupted symbol from the sequence of symbols.

In a de-spread to first signal step 25, the working set of symbols is de-spread using a subset of a first de-spreading code, e.g. $w_0(i)$, i=2, 3. The subset of the first de-spreading code thus comprises two code elements in this example.

The subset of the first de-spreading code comprises code elements corresponding to the working set of symbols, to thereby provide a first decoded signal. The first decoded signal can be associated with a first group of users, as explained above.

This de-spreading can e.g. be performed using equation (4) above.

Figure 5B:
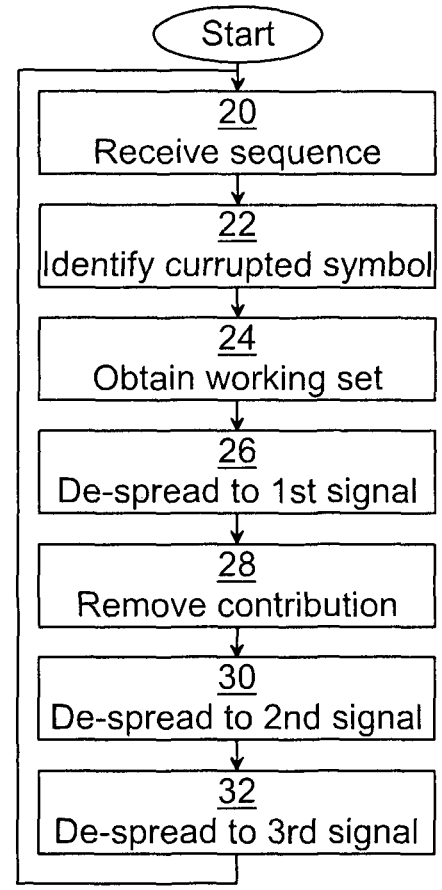

FIG. 5B is a flow chart illustrating a method according to embodiments performed in the network node of FIG. 1. Many steps correspond to those of FIG. 5A and will not be explained again.

In a remove contribution step 28, the contribution of the first decoded signal is removed from the working set of symbols, yielding an adjusted working set of symbols. This removal can be a simple subtraction of the contribution of the first decoded signal. The adjusted set of symbols can be limited to symbols in the second and third time slot to achieve orthogonality for the second and third group as explained above.

In a de-spread to second signal step 30, the adjusted working set of symbols is de-spread using a subset of a second de-spreading code. The subset of the second de-spreading code comprises code elements corresponding to the adjusted working set of symbols, to thereby provide a second decoded signal. The second decoded signal can be associated with a second group of users, as explained above.

In a de-spread to third signal step 32, the adjusted working set of symbols are de-spread using a subset of a third de-spreading code, wherein the subset of the third de-spreading code comprises code elements corresponding to the adjusted working set of symbols, to thereby provide a third decoded signal. The third decoded signal can be associated with a third group of users, as explained above.

The de-spreading to second signal and third signal can be effected using equation (5) above.

The method can then be repeated for each new sequence of symbols that is received.

Figure 6A:
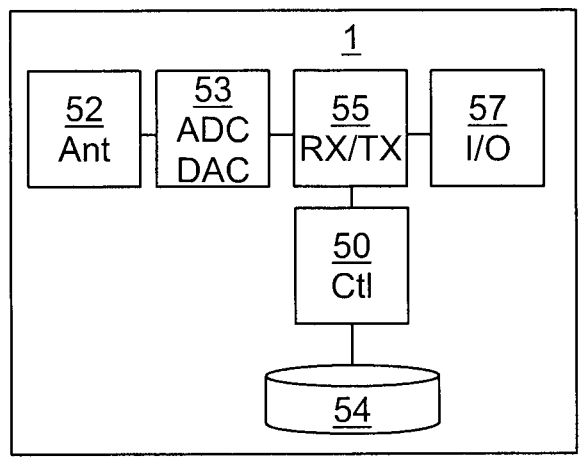
FIG. 6A is a schematic diagram showing some components of the network node of FIG. 1.

FIG. 6A is a schematic diagram showing some components of the network node 1a and/or 1b of FIG. 1. The network node is referred with reference numeral 1, since the second network node 1b of FIG. 1 can be configured in the same way. A controller 50 is provided using any suitable central processing unit (CPU), microcontroller, digital signal processor (DSP), application specific integrated circuit etc., capable of executing software instructions stored in a computer program product 54, e.g. in the form of a memory. The computer program product 54 can be a memory or any combination of read and write memory (RAM) and read only memory (ROM). The memory also comprises persistent storage, which, for example, can be any single one or combination of magnetic memory, optical memory, solid state memory or even remotely mounted memory.

The network node 1 also comprises an I/O interface 57 for communicating with the core network and optionally with other network nodes.

The network node 1 also comprises one or more transceivers 55 and a corresponding number of antennas 52 for radio communication with mobile communication terminals. A converter 53, comprising one or more analogue to digital converters (ADC) and digital to analogue converters (DAC), converts between the analogue and the digital domain. The ADC(s) and DAC(s) can be separate modules or combined in one module. The ADC of the converter 53 can be used to detect corruption of a received symbol, e.g. when the value is above a threshold value or saturation is reached.

Figure 6B:
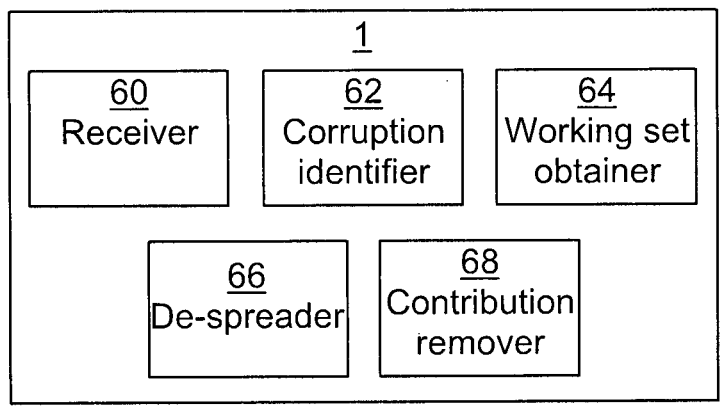
FIG. 6B is a schematic-diagram showing functional modules of the network node of FIGS. 1 and 6A.

FIG. 6B is a schematic diagram showing functional modules of the network node 1 of FIGS. 1 and 6A. The modules can be implemented using hardware and/or software such as a computer program executing in the network node 1. All modules depend on an execution environment which utilises the controller, a computer program product and optionally the I/O interface of FIG. 6A. The functional modules correspond to the methods of FIGS. 5A-B.

A receiver 60 is arranged to receive a sequence of symbols using a radio receiver.

A corruption identifier 62 is arranged to identify at least one corrupted symbol by identifying a corruption of at least the first received symbol of the plurality of symbols.

A working set obtainer 64 is arranged to obtain a working set of symbols by omitting the at least one corrupted symbol from the sequence of symbols.

A de-spreader 66 is arranged to de-spread the working set of symbols using a subset of a first de-spreading code. The subset of the first de-spreading code comprises code elements corresponding to the working set of symbols, to thereby provide a first decoded signal.

The de-spreader 66 can be further arranged to de-spread the adjusted working set of symbols using a subset of a second de-spreading code and to de-spread the adjusted working set of symbols using a subset of a third de-spreading code. The subset of the second de-spreading code then comprises code elements corresponding to the adjusted working set of symbols, to thereby provide a second decoded signal. Analogously, the subset of the third de-spreading code then comprises code elements corresponding to the adjusted working set of symbols, to thereby provide a third decoded signal.

As explained above, the first decoded signal can be associated with a first group of users, the second decoded signal can be associated with a second group of users and the third decoded signal can be associated with a third group of users.

A contribution remover 68 is arranged to remove the contribution of the first decoded signal from the working set of symbols, yielding an adjusted working set of symbols.

Figure 7:
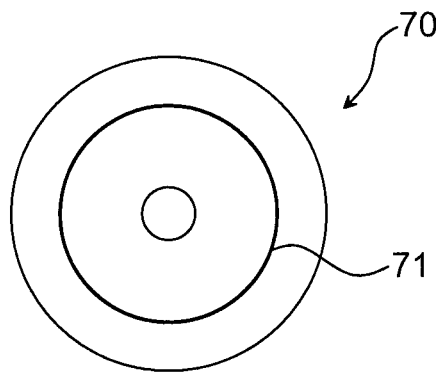
FIG. 7 shows one example of a computer program product comprising computer readable means.

FIG. 7 shows one example of a computer program product 70 comprising computer readable means. On this computer readable means, a computer program 71 can be stored, which computer program can cause a controller to execute a method according to embodiments described herein. In this example, the computer program product is an optical disc, such as a CD (compact disc) or a DVD (digital versatile disc) or a Blu-Ray disc. As explained above, the computer program product could also be embodied as a memory of a device, such as the computer program product 54 of FIG. 6A. While the computer program 71 is here schematically shown as a track on the depicted optical disk; the computer program can be stored in any way which is suitable for the computer program product.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for decoding at least one signal from a sequence of symbols, the method being implemented in a hardware network node of a mobile communication system and the method comprising:
   receiving, with the hardware network node, the sequence of symbols using a radio receiver;
   identifying, with the hardware network node, at least one corrupted symbol by identifying a corruption of at least the first received symbol of the sequence of symbols;
   obtaining, with the hardware network node, a working set of symbols by omitting the at least one corrupted symbol from the sequence of symbols; and
   de-spreading, with the hardware network node, the working set of symbols using a subset of a first de-spreading code, wherein the subset of the first de-spreading code comprises code elements corresponding to the working set of symbols, to thereby provide a first decoded signal, wherein the sequence of symbols comprises four symbols.

2. The method according to claim 1, wherein the subset of the first de-spreading code comprises two code elements.

3. A method for decoding at least one signal from a sequence of symbols, the method being implemented in a hardware network node of a mobile communication system and the method comprising:
   receiving, with the hardware network node, the sequence of symbols using a radio receiver;
   identifying, with the hardware network node, at least one corrupted symbol by identifying a corruption of at least the first received symbol of the sequence of symbols;
   obtaining, with the hardware network node, a working set of symbols by omitting the at least one corrupted symbol from the sequence of symbols;
   de-spreading, with the hardware network node, the working set of symbols using a subset of a first de-spreading code, wherein the subset of the first de-spreading code comprises code elements corresponding to the working set of symbols, to thereby provide a first decoded signal;
   removing, with the hardware network node, the contribution of the first decoded signal from the working set of symbols, yielding an adjusted working set of symbols;
   de-spreading, with the hardware network node, the adjusted working set of symbols using a subset of a second de-spreading code, wherein the subset of the second de-spreading code comprises code elements corresponding to the adjusted working set of symbols, to thereby provide a second decoded signal; and
   de-spreading, with the hardware network node, the adjusted working set of symbols using a subset of a third de-spreading code, wherein the subset of the third de-spreading code comprises code elements corresponding to the adjusted working set of symbols, to thereby provide a third decoded signal.

4. The method according to claim 3, wherein the first decoded signal is associated with a first group of users, the second decoded signal is associated with a second group of users and the third decoded signal is associated with a third group of users.

5. The method according to claim 3, wherein the sequence of symbols comprises four symbols;
the step of de-spreading to provide the first decoded signal comprises de-spreading the last two symbols of the sequence of symbols;
the step of de-spreading to provide the second decoded signal comprises de-spreading the second and third symbols of the sequence of symbols; and
the step of de-spreading to provide the third decoded signal comprises de-spreading the second and third symbols of the sequence of symbols.

6. The method according to claim 3, wherein the step of removing comprises subtracting the contribution of the first decoded signal from the working set of symbols.

7. A hardware network node for decoding at least one signal from a sequence of symbols, the hardware network node being configured to operate in a mobile communication system and the hardware network node comprising:
a receiver configured to receive the sequence of symbols using a radio receiver;
a corruption identifier configured to identify at least one corrupted symbol by identifying a corruption of at least the first received symbol of the sequence of symbols;
a working set obtainer configured to obtain a working set of symbols by omitting the at least one corrupted symbol from the sequence of symbols; and
a de-spreader configured to de-spread the working set of symbols using a subset of a first de-spreading code, wherein the subset of the first de-spreading code comprises code elements corresponding to the working set of symbols, to thereby provide a first decoded signal,
wherein the sequence of symbols comprises four symbols.

8. The hardware network node according to claim 7, wherein the subset of the first de-spreading code comprises two code elements.

9. A hardware network node for decoding at least one signal from a sequence of symbols, the hardware network node being configured to operate in a mobile communication system and the hardware network node comprising:
a receiver configured to receive the sequence of symbols using a radio receiver;
a corruption identifier configured to identify at least one corrupted symbol by identifying a corruption of at least the first received symbol of the sequence of symbols;
a working set obtainer configured to obtain a working set of symbols by omitting the at least one corrupted symbol from the sequence of symbols;
a de-spreader configured to de-spread the working set of symbols using a subset of a first de-spreading code, wherein the subset of the first de-spreading code comprises code elements corresponding to the working set of symbols, to thereby provide a first decoded signal;
a contribution remover configured to remove the contribution of the first decoded signal from the working set of symbols, yielding an adjusted working set of symbols; and
the de-spreader is further configured to:

de-spread the adjusted working set of symbols using a subset of a second de-spreading code, wherein the subset of the second de-spreading code comprises code elements corresponding to the adjusted working set of symbols, to thereby provide a second decoded signal; and de-spread the adjusted working set of symbols using a subset of a third de-spreading code, wherein the subset of the third de-spreading code comprises code elements corresponding to the adjusted working set of symbols, to thereby provide a third decoded signal.

10. The hardware network node according to claim 9, wherein the first decoded signal is associated with a first group of users, the second decoded signal is associated with a second group of users and the third decoded signal is associated with a third group of users.

11. The hardware network node according to claim 9, wherein the sequence of symbols comprises four symbols; and the de-spreader is further configured to:
provide the first decoded signal comprising de-spreading the last two symbols of the sequence of symbols;
provide the second decoded signal comprising de-spreading the second and third symbols of the sequence of symbols; and
provide the third decoded signal comprising de-spreading the second and third symbols of the sequence of symbols.

12. A computer program product for decoding at least one signal from a sequence of symbols in a hardware network node of a mobile communication system, the computer program product comprising a non-transitory computer readable medium containing a computer program code which, when run on the hardware network node, causes the hardware network node to perform the steps of:
receiving the sequence of symbols using a radio receiver;
identifying at least one corrupted symbol by identifying a corruption of at least the first received symbol of the sequence of symbols;
obtaining a working set of symbols, by omitting the at least one corrupted symbol from the sequence of symbols;
de-spreading the working set of symbols using a subset of a first de-spreading code, wherein the subset of the first de-spreading code comprises code elements corresponding to the working set of symbols, to thereby provide a first decoded signal;
removing the contribution of the first decoded signal from the working set of symbols, yielding an adjusted working set of symbols;
de-spreading the adjusted working set of symbols using a subset of a second de-spreading code, wherein the subset of the second de-spreading code comprises code elements corresponding to the adjusted working set of symbols, to thereby provide a second decoded signal; and
de-spreading the adjusted working set of symbols using a subset of a third de-spreading code, wherein the subset of the third de-spreading code comprises code elements corresponding to the adjusted working set of symbols, to thereby provide a third decoded signal.

* * * * *